United States Patent

[11] 3,627,725

[72] Inventor Jack C. Gilles
   Shaker Heights, Ohio
[21] Appl. No. 804,035
[22] Filed Dec. 23, 1968
[45] Patented Dec. 14, 1971
[73] Assignee The B. F. Goodrich Company
   New York, N.Y.
   Original application Sept. 8, 1966, Ser. No. 577,847. Divided and this application Dec. 23, 1968, Ser. No. 804,035

[54] BIS (3,5-DIALKYL-4-HYDROXYBENZYL) MALONIC ESTERS FOR STABILIZING POLYMERS
   8 Claims, No Drawings

[52] U.S. Cl. .................................................... 260/45.85,
   99/163, 252/57, 260/45.7 S, 260/45.95, 260/810, 260/814, 260/666.5
[51] Int. Cl. ..................................................... C08d 11/04,
   C08f 45/58

[50] Field of Search............................................ 260/45.85, 810, 814

[56] References Cited
   UNITED STATES PATENTS

| | | | |
|---|---|---|---|
| 3,249,632 | 5/1966 | 260 ............................. | 45.85/ |
| 3,280,069 | 10/1966 | Knapp ......................... | 260/45.85 |
| 3,367,908 | 2/1968 | Peterson et al. .............. | 260/45.85 |

Primary Examiner—Donald E. Czaja
Assistant Examiner—V. P. Hoke
Attorneys—J. Hughes Powell, Jr. and Ernest K. Bean ABSTRACT: Olefin polymers are effectively stabilized against oxidative degradation by the incorporation therein of small amounts of bis(3,5-dialkyl-4-hydroxybenzyl)malonic esters. Polyethylene and polypropylene stability is markedly improved by the addition of a stabilizing amount of diethyl-$\alpha,\alpha$-(3,5-di-t-butyl-4-hydroxybenzyl)malonate.

BIS (3,5-DIALKYL-4-HYDROXYBENZYL) MALONIC ESTERS FOR STABILIZING POLYMERS

This is a division of application Ser. No. 577,847, filed Sept. 8, 1966.

This invention relates to bis (3,5-dialkyl-4-hydroxybenzyl) malonic esters, and their use as antioxidants for olefin polymers.

The novel bis(3,5-dialkyl-4-hydroxybenzyl) malonic esters have the formula

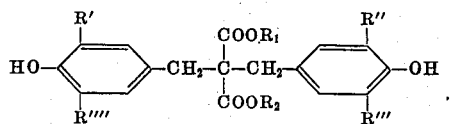

wherein $R_1$ and $R_2$ are alkyl radicals, either the same or different, containing one to 18 carbon atoms and $R'$, $R''$, $R'''$ and $R''''$ are alkyl radicals, either the same or different, containing from one to nine carbon atoms. Preferred antioxidants are those where $R_1$ and $R_2$ are alkyl radicals containing one to four carbon atoms and $R'$, $R''$, $R'''$ and $R''''$ are tertiary alkyl radicals containing from four to nine carbon atoms. An especially preferred antioxidant of this invention is diethyl α, α-bis (3,5-di-tert-butyl-4-hydroxybenzyl) malonate having the formula

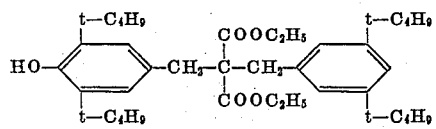

other useful compounds of this invention include: methylethyl-α, α-bis(3,5-di-tert-butyl-4-hydroxybenzyl) malonate, dioctyl-α, α-bis (3,5-di-tert-butyl-4-hydroxybenzyl)malonate; dilauryl-α, α-bis (3,5-di-tert-butyl-4-hydroxybenzyl)malonate; distearyl-α, α-bis (3,5-di-tert-butyl-4-hydroxybenzyl)malonate; diethyl-α, α-bis (3,5dimethyl-4-hydroxybenzyl)malonate; diethyl-α, α-bis (3,5-diisopropyl-4-hydroxybenzyl)malonate; diethyl-α, α-bis (3,5-di-tert-amyl-4-hydroxybenzyl)malonate; diethyl-α, α-bis (3-tert-butyl-5-tert-amyl-4-hydroxybenzyl)malonate; diethyl-α, α-bis[3,5-di-(1,1-dimethyl butyl)-4-hydroxybenzyl] malonate; diethyl-α, α-bis[3,5-di-(1,1,2-trimethyl butyl)-4-hydroxybenzyl] malonate; diethyl-α, α-bis[3,5-di-(1,1-dimethyl pentyl)-4-hydroxybenzyl] malonate.

The bis (3,5-dialkyl-4-hydroxybenzyl) malonic esters are high-melting crystalline solids soluble in aromatic hydrocarbons such as benzene and toluene, ethers, ketones, alcohols and the like. They are easily incorporated into olefin polymers by conventional techniques and generally need no special processing. They are mixed into the polymers on a mill, in an internal mixer or kneader; in solutions or dispersions of the polymer; in solvents, masterbatched with other compounding ingredients, or as is. They may be used in polymers in combination with conventional processing oils, plasticizers, lubricants, antisticking agents, fillers, reinforcing agents, sulfur and other curing agents, accelerators, stabilizers, antioxidants, antiozonants, and the like. They are compatible with known antioxidants and antiozonants and in combination with certain of these show synergistic activity.

Olefin polymers which may be protected against oxidative deterioration by the compounds of this invention include both rubbers and plastics such as polyethylene, ethylene-propylene copolymers, polypropylene, poly(4-methylpentene-1) polystyrene, polyisobutylene, isobutylene-isoprene copolymers, isobutylene- styrene copolymers, polybutadiene, butadiene-styrene copolymers butadiene-acrylonitrile copolymers, butadiene-acrylic and methacrylic acid copolymers, butadiene-alkyl acrylate or methacrylate copolymers, butadiene-vinyl pyridine copolymers, butadiene-chlorostyrene copolymers, butadiene-methyl vinyl ketone copolymers, polyisoprene, polychloroprene, ethylenepropylene terpolymers, and the like. The bis(3,5-dialkyl-4-hydroxybenzyl)malonic esters may also be used to protect other materials, such as petroleum products, vegetable oils, animal fats and the like, against deterioration caused by oxygen.

The amount of bis(3,5-dialkyl-4-hydroxybenzyl) malonic ester to be used will vary with the material to be protected and service conditions, but generally will range between about 0.01 percent and about 5 percent, and more preferably between about 0.1 percent and 2.0 percent by weight.

The method of preparation for the novel compounds of this invention in general consists of reacting a 3,5-dialkyl-4-hydroxybenzyl halide with a malonic ester in the presence of an alkali metal alcoholate. It is generally preferred for the best yields that the reaction be conducted in an inert hydrocarbon solvent and the reactants be present in the most favorable stoichiometry, that is, 2 mols of the hydroxybenzyl halide per mol of malonic ester.

The following examples are intended to describe the invention more fully, but not to limit the scope thereof. All parts unless otherwise indicated are given on a weight basis.

EXAMPLE I

Preparation of Diethyl-α, α-Bis(3,5-Di-Tert- Butyl-4-Hydroxybenzyl) Malonate

One mol of ethanol (46 grams) was placed in the reaction vessel and 11.5 grams of sodium metal (0.5 mol) added in small chunks so that a slow evolution of hydrogen was maintained. When the sodium metal was completely reacted, 40 grams of diethyl malonate (0.25 mol) was added dropwise with stirring. The reaction mixture was allowed to stir about 16 hours during which time a white precipitate formed. 3,5-Di-tert-butyl-4-hydroxybenzyl chloride (127 grams; 0.5 mol) was dissolved in hexane, dropped into the reaction mixture, stirred at room temperature and refluxed for 2 additional hours. After cooling, the sodium chloride was removed by filtration and water washing. A 90 percent yield of white solid melting at 158°–159° C. was obtained. Nuclear magnetic resonance analysis confirmed the structure as diethyl-α, α-bis (3,5-di-tert-butyl-4-hydroxybenzyl) malonate.

EXAMPLE II

Preparation Of Methylethyl-α, α-Bis(3,5-Di-Tert-Butyl-4-Hydroxybenzyl) Malonate

Sodium methylate (54 grams; 1.0 mol) and 160 grams diethyl malonate (1.0 mol) in toluene were heated at reflux and methanol removed with a Dean-Stark trap. When the methanol evolution was complete, the reaction mixture was stripped and then suspended in ligroin. A ligroin solution containing 3,5-di-tert-butyl-4-hydroxybenzyl chloride (254 grams; 1.0 mol) was then added dropwise to the suspension while maintaining the temperature at about 30° C. When the addition was complete, the reaction mixture was refluxed for 4 hours and stirred about 16 hours. About 100 grams of product was obtained, which after recrystallization from aqueous ethanol melted at 136°–139° C. Analysis by nuclear magnetic resonance and mass spectroscopy indicated the product as a mixture of the dimethyl, diethyl and methylethyl esters, however, methylethyl-α, α-bis (3,5-di-tert-butyl-4-hydroxybenzyl) malonate was the predominant product.

EXAMPLE III

Preparation of Dilauryl-α, α-Bis(3,5-Di-Tert-Butyl-4-Hydroxybenzyl) Malonate

Similar to example I, 37 grams lauryl alcohol (0.2 mol) was reacted with 4.6 grams sodium metal (0.2 mol) in ligroin. After all the sodium had reacted, 16 grams dilauryl malonate (0.1 mol) was added dropwise and stirred about 16 hours. 3,5-di-tert-butyl-4-hydroxybenzyl chloride (51 grams; 0.2 mol) was then added. The product recovered was recrystallized from ethanol, m.p. 109.5°–110.5° C. and the structure was confirmed as dilauryl-α, α-bis(3,5-di-tert-butyl-4-hydroxybenzyl) malonate.

EXAMPLE IV

This example illustrates the use of the novel bis(3,5-dialkyl-4-hydroxybenzyl) malonic esters of this invention as antioxidants for polyethylene. The antioxidants were weighed, dissolved in acetone and added to unstabilized high-density polyethylene in acetone suspension. The mixture was then stripped to dryness with a flash evaporator and mixed for about 5 minutes at 290°–300° F. on a mill. The milled polymer was compression molded into sheets having a thickness of 0.025 inch. Six inch dumbbells were cut from the sheets, mounted in racks so that both ends are fastened and the specimen assumes a horeshoe-shape and placed in an air-circulating oven maintained at 125° C. At regular intervals the samples were removed from the oven, allowed to cool to room temperature and the loop pinched. The sample fails if the loop breaks. The test is resumed until all the samples fail. Table I sets forth the data obtained from the 125° C. air-circulating oven test.

TABLE I

| | Hours to failure |
|---|---|
| Control (no antioxidant) | 96 |
| Methylethyl-α, α-bis(3,5-di-tert-butyl-4-hydroxybenzyl) malonate (0.1 phr.) | 1,680 |
| Diethyl-α,α-bis(3,5-di-tert-butyl-4-hydroxybenzyl) malonate (0.1 phr.) | 1,848 |
| Dilauryl-α,α-bis(3,5-di-tert-butyl-4-hydroxybenzyl) malonate (0.1 phr.) | 1,276 |

Oxygen absorption was measured using a modified Scott Tester Block. One inch circles were cut from 0.010 inch sheets and pressed onto aluminum screens. Six samples were placed in each tube to be tested and the system thoroughly flushed and then filled with oxygen. The tubes were maintained at 140° C. and the induction periods determined by noting at regular intervals the amount of oxygen absorbed. Data are set forth below in table II.

TABLE II

| | Induction period (hours) |
|---|---|
| Control (no antioxidant) | 6 |
| Methylethyl-α, α-bis(3,5-di-tert-butyl-4-hydroxybenzyl) malonate (0.1 phr.) | 78 |
| Diethyl-α,α-bis(3,5-di-tert-butyl-4-hydroxybenzyl) malonate (0.1 phr.) | 59 |
| Dilauryl-α,α-bis(3,5-di-tert-butyl-4-hydroxybenzyl) malonate (0.1 phr.) | 69 |
| Dilauryl thiodipropionate (0.3 phr.) | 58 |
| Methylethyl-α,α-bis(3,5-di-tert-butyl-4-hydroxybenzyl) malonate (0.1 phr.) + dilauryl thiodipropionate (0.3 phr.) | 304 |
| Diethyl-α,α-bis(3,5-di-tert-butyl-4-hydroxybenzyl) malonate (0.1 phr.) + dilauryl thiodipropionate (0.3 phr.) | 299 |

It was also noted that polyethylene protected with the antioxidants of this invention were not particularly prone to excessive discoloration. For example, several samples placed in an 170° C. air-circulating oven showed little or no yellowing after about 96 hours.

EXAMPLE V

Similar to example IV, 0.1 gram diethyl-α,α-bis(3,5-di-tert-butyl-4-hydroxybenzyl) malonate was dissolved in acetone and added to 100 grams poly(4-methylpentene-1) suspended in acetone. The acetone was evaporated and the polymer compression molded into sheets of 0.010 inch thickness. Samples were prepared and the oxygen absorption measured at 140° C. Data are set forth in table III.

| | Induction Period (hours) |
|---|---|
| Control (no antioxidant) | 4 |
| Diethyl-α,α-bis(3,5-di-tert-butyl-4-hydroxybenzyl) malonate (0.1 phr.) | 60 |
| Diethyl-α,α-bis(3,5-di-tert-butyl-4-hydroxybenzyl) malonate (0.1 phr.) + dilauryl thiodipropionate (0.2 phr.) | 285 |

When the diethyl-α,α-bis(3,5-di-tert-butyl-4-hydroxybenzyl) malonate is compounded and tested in oil-extended styrene-butadiene copolymer used for tire treads and in ethylene-propylene polymer similar resistance to oxidation is observed. Diethyl-α,αbis(3,5-dimethyl-4-hydroxybenzyl) malonate, tested similarly, is also quite an effective antioxidant.

From the examples it is evident that the addition of small amounts of the bis(3,5-dialkyl-4-hydroxybenzyl) malonate esters of this invention greatly improve the stability of olefin polymers against the effects of oxygen. The bis(3,5-dialkyl-4-hydroxybenzyl) malonate esters, when combined with organic sulfides in the ratio of about 5:1 to about 1:5 and the combination added to the olefin polymers in amounts ranging from about 0.01 to about 5 percent by weight, behave synergistically. Exemplary of the organic sulfides which can be used include R—S—R, R—S—(CH$_2$)$_{1-8}$—S—R, R—S—(CH$_2$)—O—(CH$_2$)$_2$—S—R, RCOO(CH$_2$)$_2$—S—(CH$_2$)$_2$OH, RCOO(CH$_2$)—S—(CH$_2$)$_2$ OOCR and the like, where R are alkyl groups containing up to 24 carbon atoms. Particularly useful are sulfides of the formula S$+$(CH$_2$)$_2$—COOR)$_2$ wherein R is an alkyl radical containing 12–18 carbon atoms. Bis(3,5-dialkyl-4-hydroxybenzyl) malonate esters with dilauryl or distearyl thiodipropionate are especially useful synergistic combinations which impart oxidative stability to olefin polymers which greatly exceeds the requirements for most applications.

I claim:

1. An olefin polymer containing stabilizing amounts of a bis(3,5-dialkyl-4-hydroxybenzyl) malonic ester having the formula

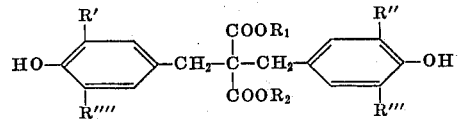

wherein R$_1$ and R$_2$ are alkyl radicals having from one to 18 carbon atoms and R', R'', R''' and R'''' are alkyl radicals having from one to nine carbons atoms.

2. The olefin polymer composition of claim 1 containing from about 0.01 to about 5 percent by weight of the bis(3,5-dialkyl-4-hydroxybenzyl) malonic ester.

3. The composition of claim 1, wherein R', R'', R''' and R'''' of the bis(3,5-dialkyl-4-hydroxybenzyl) malonic ester are tertiary alkyl radicals containing from four to nine carbon atoms and R$_1$ and R$_2$ are alkyl radicals having from one to four carbon atoms.

4. The composition of claim 1, wherein R', R'', R''' and R'''' of the bis(3,5-dialkyl-4-hydroxybenzyl) malonic ester are tertiary butyl radicals and R$_1$ and R$_2$ are ethyl radicals.

5. The composition of claim 1, wherein the olefin polymer of an olefin containing from two to six carbon atoms.

6. The composition of claim 1, wherein the olefin polymer is polyethylene.

7. The composition of claim 5, wherein the olefin polymer is a polymer of a conjugated diolefin containing four to five carbon atoms.

8. The composition of claim 5 containing 0.01 to 5 percent of an organic sulfide of the formula $S+(CH_2\ COOR)_2$ wherein R is an alkyl radical containing 12–18 carbon atoms.

* * * * *

Disclaimer 3,627,725.—*Jack C. Gilles*, Shaker Heights, Ohio. BIS (3,5-DIALKYL-4-HYDROXYBENZYL) MALONIC ESTERS FOR STABILIZING POLYMERS. Patent dated Dec. 14, 1971. Disclaimer filed Feb. 3, 1972, by the assigneee, *The B. F. Goodrich Company*.
Hereby enters this disclaimer to claims 1 through 8 of said patent.
[*Official Gazette September 19, 1972.*]